United States Patent [19]
Szybura

[11] Patent Number: 5,720,456
[45] Date of Patent: Feb. 24, 1998

[54] THIRD HAND HOLDER

[76] Inventor: William S. Szybura, 22610 177th St. East, Orting, Wash. 98360

[21] Appl. No.: 714,820

[22] Filed: Sep. 17, 1996

[51] Int. Cl.$^6$ ............................... B23K 37/04; B25B 5/00
[52] U.S. Cl. ...................... 248/126; 248/141; 248/176.1; 248/231.81; 248/288.11
[58] Field of Search ................... 248/121, 122.1, 248/126, 130, 141, 231.81, 176.1, 286.1, 288.11, 313

[56] References Cited

U.S. PATENT DOCUMENTS

| | | |
|---|---|---|
| D. 335,676 | 5/1993 | Szybura . |
| 370,607 | 9/1887 | Chandler . |
| 1,742,041 | 12/1929 | Mangold . |
| 2,036,655 | 4/1936 | Storaasli ........................ 248/231.81 |
| 2,535,586 | 12/1950 | McElroy . |
| 2,552,844 | 5/1951 | Clinehens . |
| 3,144,232 | 8/1964 | Smootz ........................ 248/122.1 X |
| 3,179,156 | 4/1965 | Weiss et al. . |
| 3,540,429 | 11/1970 | Varberg et al. . |
| 4,093,316 | 6/1978 | Iida . |
| 4,278,223 | 7/1981 | Fauteux ........................ 248/121 X |
| 4,738,242 | 4/1988 | Hart . |
| 4,779,608 | 10/1988 | Smith . |
| 4,784,360 | 11/1988 | Mok . |
| 5,100,007 | 3/1992 | Espasandin et al. . |

FOREIGN PATENT DOCUMENTS

918858  10/1954  Germany .

*Primary Examiner*—Robert Canfield
*Attorney, Agent, or Firm*—Chase & Yakimo

[57] ABSTRACT

A holder for a propane gas torch or the like and an item to be heated by the torch comprises a generally horseshoe-shaped base presenting first and second legs having first and second free ends in a normal contiguous relationship therebetween. The base is of a resilient material allowing for the free ends of the base to be spaced apart to place the item to be heated therebetween. Upon return of the free ends of the legs to the normal relationship the item is clamped by the base. A cradle assembly is mounted to the base in swingable and longitudinal movement relative thereto. Upon placement of the propane gas torch within the cradle, cradle movement is transferred to the propane gas torch. The cylinder further allows for a rotation of the torch about is own central longitudinal axis. The cradle enables the user to position the torch discharge head onto a desired portion of the item to be heated. In turn, the hands of the user are freed for other purposes.

20 Claims, 6 Drawing Sheets

THIRD HAND HOLDER

BACKGROUND OF THE INVENTION

This invention relates to a third hand holder and, more particularly, to an adjustable holder for a gas torch as well as the item being heated by the torch.

During use of a gas torch for heating another item, such as glass, jewelry, metal or the like, the torch is held by the user in one hand so as to direct the flame onto the item held by the other. At times it is desirable to free either one or both hands of the user enabling the user to hold other objects or attend to other matters. In some instances, it is desirable to remove the item from the user's hand as the heat from the item may be transferred thereto.

In response thereto I have invented a holder for a gas torch or the like, the torch releasably insertable into a cradle. The cradle allows for rotation of the gas torch about its central longitudinal axis. This cradle further rotates the torch about a horizontal axis spaced from the underlying base and through an arc about 180°. Longitudinally slidable movement of the torch, relative to the underlying support base is also provided by this cradle. The base presents first and second resilient legs presenting free leg ends. The legs are made of a resilient material such that the leg free ends normally bear one against the other. At these free ends gripping surfaces are provided so as to clamp the item to be heated by the torch therebetween. In use, user manipulation of the cradle rotates the torch to various positions so as to direct the heat upon a desired portion of the item. Accordingly, the user need not subsequently hold the torch and/or item during use.

It is therefore a general object of this invention to provide a holder which holds a gas torch or the like as well as the item at which the torch's heat is to be directed.

Another object of this invention is to provide a holder, as aforesaid, the torch being received in a cradle, the cradle being swingable about a horizontal axis and slidable along a longitudinal axis relative to the underlying base.

A further object of this invention is to provide a holder, as aforesaid, the cradle allowing for rotation of the torch about its central longitudinal axis.

A still further object of this invention is to provide a holder, as aforesaid, wherein either the torch and/or the item need not be manipulated by the user.

Another object of this invention is to provide a holder, as aforesaid, which provides a stable support base for the torch and item.

A still further object of this invention is to provide a holder, as aforesaid, the base presenting releasable clamping surfaces for engaging the item to be heated by the torch.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
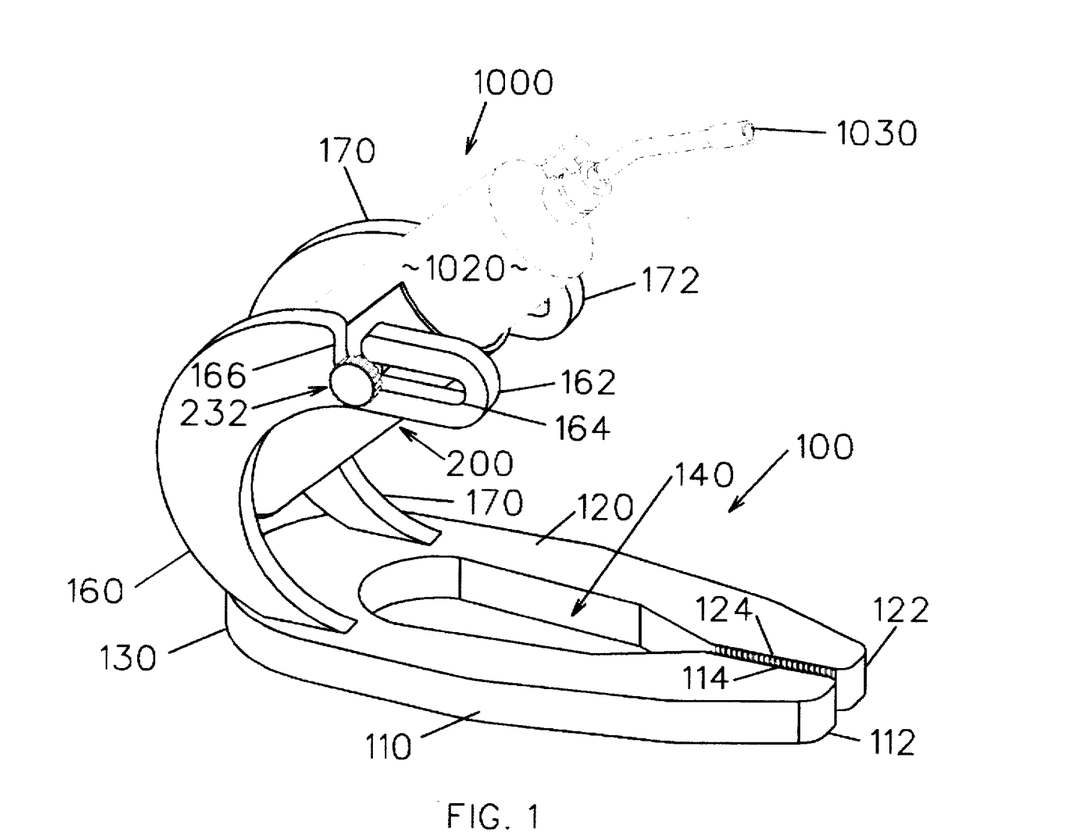
FIG. 1 is a perspective view of the holder, a gas torch being shown in phantom lines.
Figure 2:
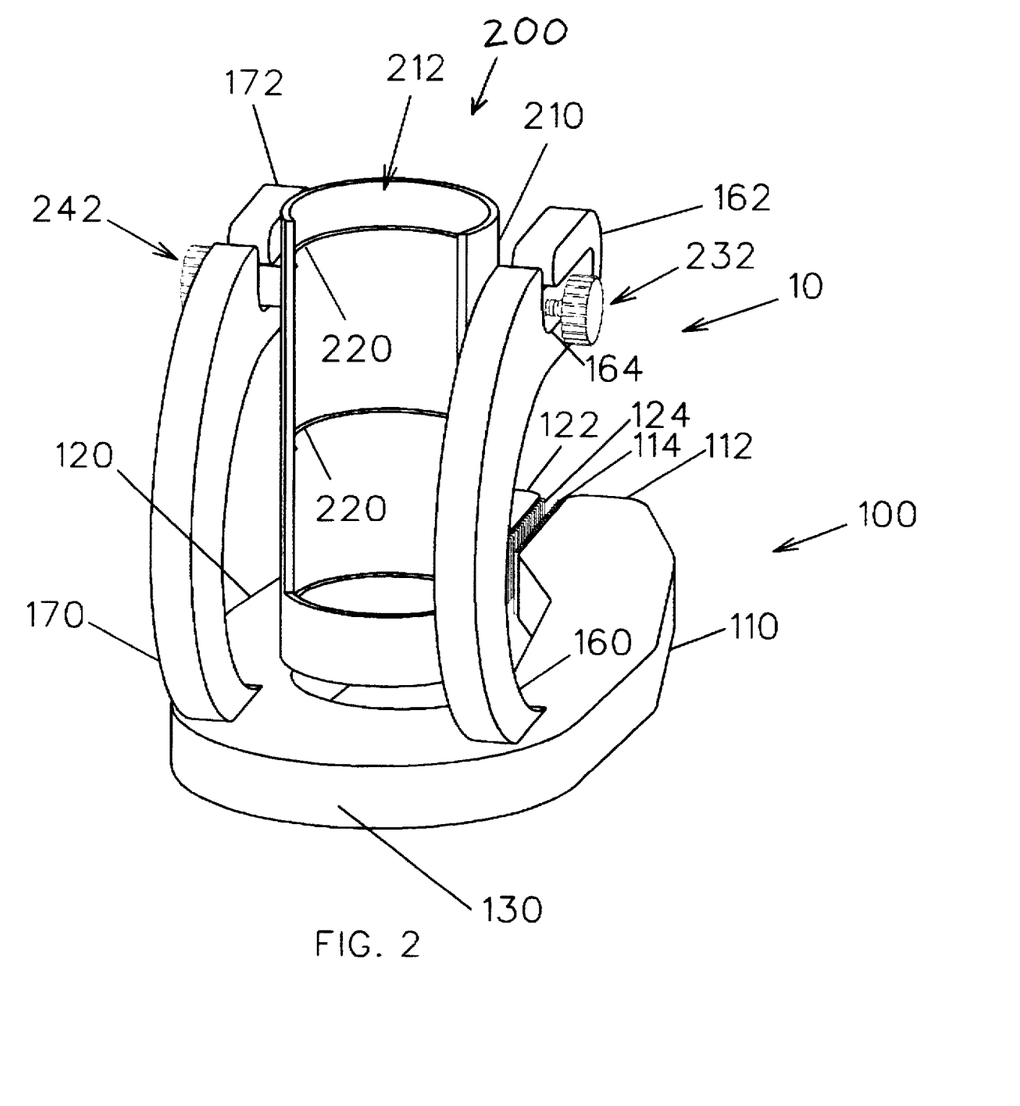
FIG. 2 is a rear perspective view of the holder, the torch being removed from the cradle.
Figure 3:
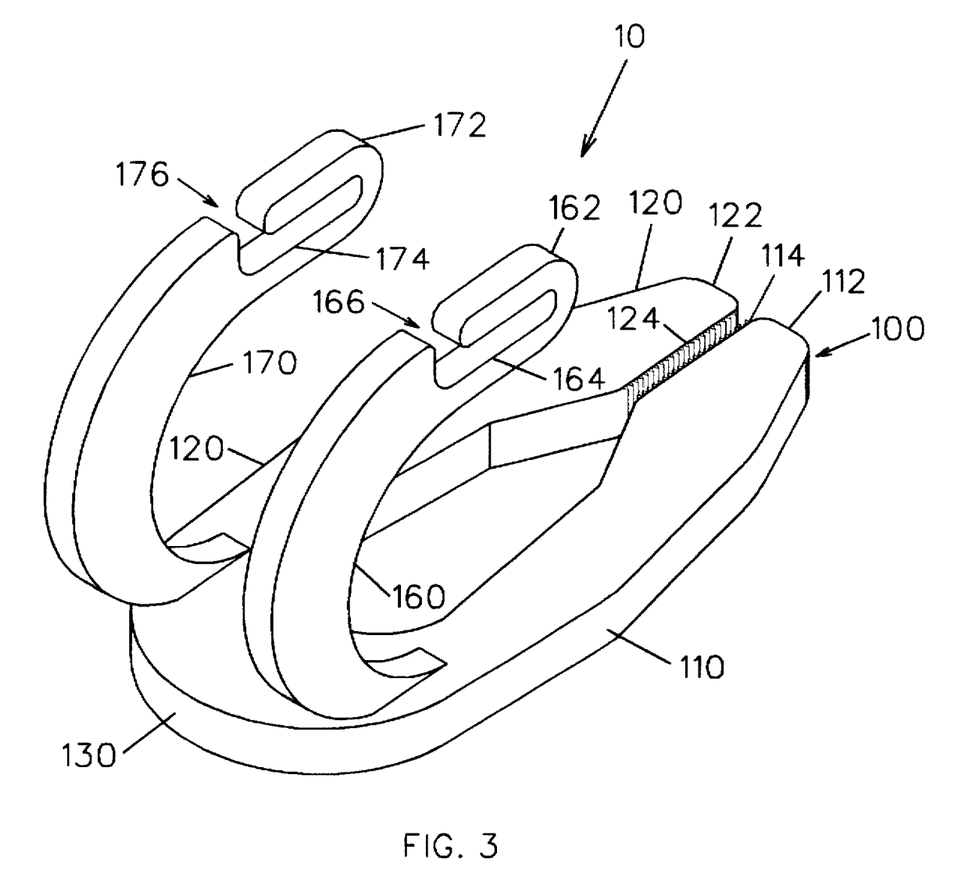
FIG. 3 is a perspective view of the base of the holder with the torch cradle removed.
Figure 4:
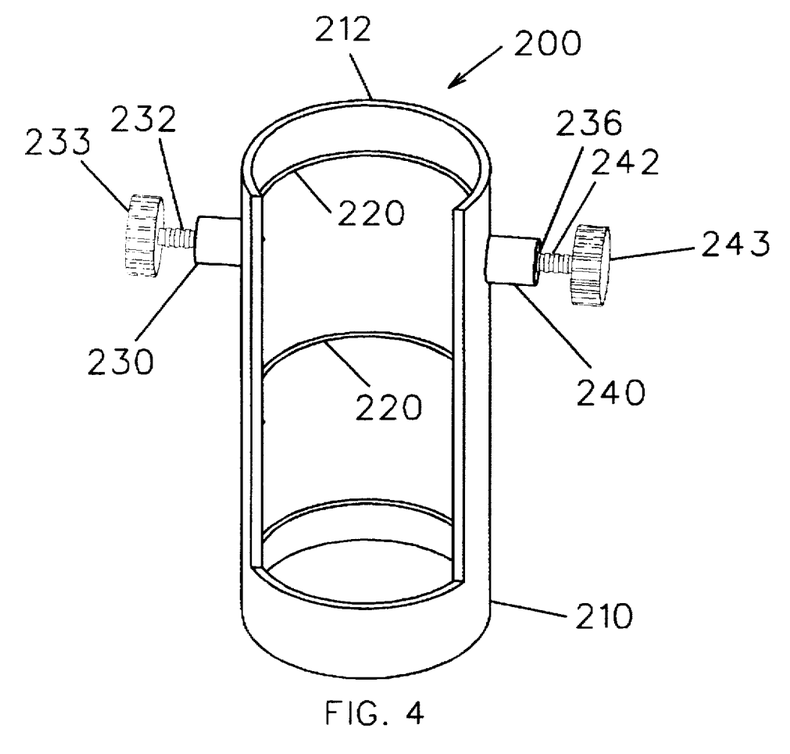
FIG. 4 is a view of the torch cradle as removed from the holder.

Turning more particularly to the drawings, FIG. 1 illustrates the holder 10 as generally comprising a base 100 with a cradle assembly 200 mounted thereto, the cradle assembly 200 adapted to releasably receive a gas propane torch 1000 as shown in phantom lines therein.

Base 100 is made of a resilient material and generally comprises first 110 and second 120 legs, each leg 110, 120 having free ends 112, 122. Legs 110, 120 are connected by an arc 130 so as to present a free area/aperture 140 between the legs 110, 120. The interior surface 114, 124 at the free ends 112, 122 of legs 110, 120 are ribbed or otherwise roughened so as to present gripping/clamping surfaces for an item to be placed therebetween.

Figure 5:
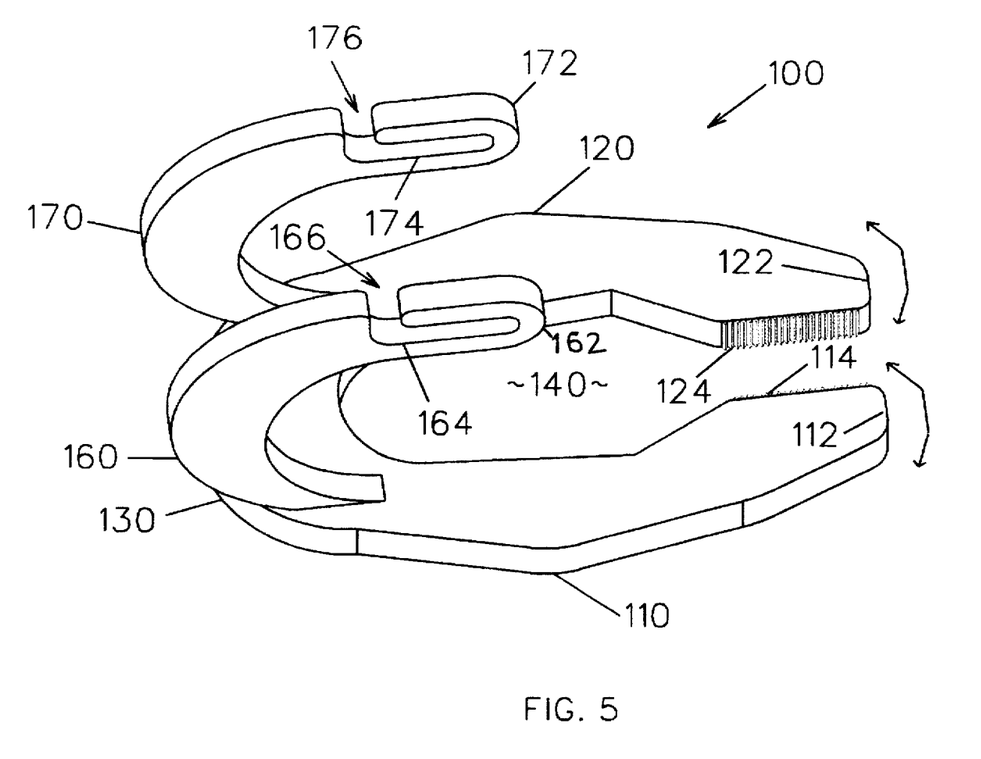
FIG. 5 is a side perspective view of the base of the holder, the leg free ends of the base being moved away from their normal clamping positions.
Figure 6:
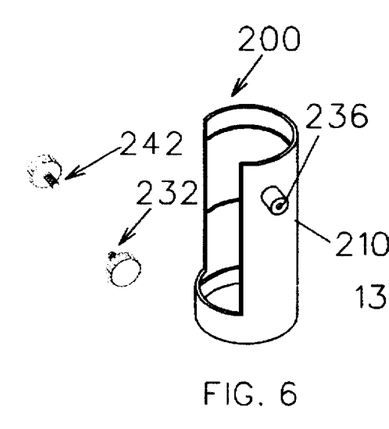
FIG. 6 is a perspective view of the cradle of the holder with the knurled pivot pins exploded therefrom.
Figure 7:
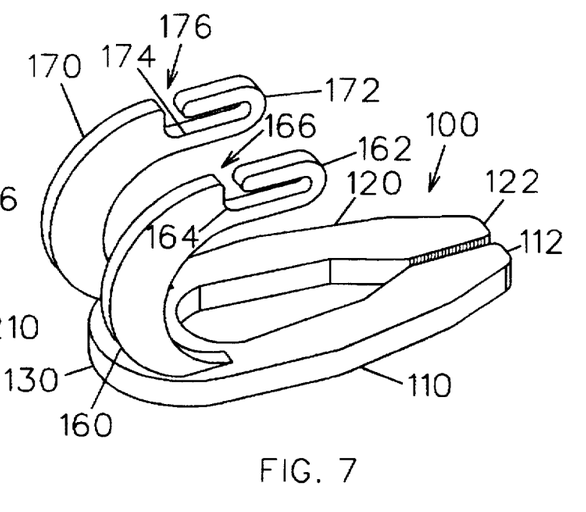
FIG. 7 is a perspective view of the base of FIG. 5, on a reduced scale, the leg free ends of the base being at their normal clamping position.

Normally, as provided by the horseshoe shape of base 100 and the resilient material utilized, surfaces 114, 124 are contiguous one to the other as shown in FIG. 1. Upon moving the leg free ends 112, 122 to a spaced-apart relationship (FIG. 5) the item (not shown) to be heated by torch 1000 can be inserted between surfaces 114, 124. Thus, upon allowing legs 110, 120 to return to their normal FIG. 1 contiguous relationship, the gripping surfaces 114, 124 clamp the item therebetween.

Outwardly extending from the base 100 and from legs 110, 120 are two parallel curvilinear cradle mounting arms 160, 170. The arms 160, 170 swing beyond the leg connecting arc 130, towards the gripping surfaces 114, 124 and terminate at free ends 162, 172. This arm/base configuration distributes the weight along holder 10 to prevent tipping of the base, particularly when a torch 1000 is in the cradle 200.

Arms 160, 170 further present longitudinal horizontal slots 164, 174, the slots being in communication with inlet notches 166, 176.

The cradle assembly 200 comprises a cylinder 210 having internal ribs 220 therein. The cylinder 210 receives at the open end 212 the cylinder 1020 of the gas torch 1000 therein preferably in a friction fit relationship therebetween. Ribs 220 diminish longitudinal shifting of torch 1000 from cylinder 210 but allow for rotation of the cylinder 1020 of torch about its own central longitudinal axis.

Lugs 230, 240 extend from opposed sides of cylinder 210, the lugs presenting threaded apertures 236 to receive the ends of knurled pivot pins 232, 242 therein. Thus, the effective length of the pivot pins 232, 242 is adjustable by rotation of the knurled ends 233, 243 thereof. The pins 232, 242 are adapted to be first releasably received in the inlet notches 166, 176 and then slidable along respective slots 164, 174.

Utilizing structure as above described, torch 1000 is inserted into cylinder 210 with the item to be heated by the torch being placed between the gripping surfaces 114, 124. The heat discharge end 1030 of torch is adjustable by swingable movement of the cylinder 210 about the horizontal axis extending through pivot pins 232, 242 as mounted in the arms 160, 170. Longitudinal slidable movement of cylinder 210 along the slots 164, 174 provides similar movement of torch relative to the underlying base 100. Rotation of cylinder 1020 about its own central longitudinal axis further positions the torch head 1030. Thus, the discharge head 1030 of the torch 1000 can be variously positioned so as to more easily direct the heat from torch 1000 onto the desired portion of the item being gripped between the surfaces 114, 124. Thus, the holder 10 frees the hand(s) of the user once the torch 1000 and/or item are in place.

It is understood the above structure may be used for other combination of items in which one item is to be placed in cradle 200 and be directed to an item clamped between the gripping surfaces 114, 124.

It is to be understood that while a certain form of this invention has been illustrated and described, it is not limited thereto except insofar as such limitations are included in the following claims and allowable functional equivalents thereof.

Having thus described the invention, what is claimed as new and desired to be secured by Letters Patent is as follows:

1. A holder for a gas torch, the torch having a discharge head for directing heat therefrom onto an item, the holder comprising:
   a base, said base comprising:
      first and second legs presenting free ends at an end of each leg;
      means for positioning said free ends of said legs in a first normal contiguous relationship and a second spaced-apart relationship;
   a cradle for a gas torch;
   first means on said base for mounting said cradle above said base in a user-operable swingable movement about a horizontal axis above said base;
   second means for mounting said swingable cradle to said base in a user-operable longitudinal movement along said underlying base, said user operable movements adapt to position a heat discharge head of a torch in said cradle onto an item positioned between said contiguous leg free ends.

2. The holder as claimed in claim 1 wherein said first mounting means comprises:
   first and second arms respectively upwardly extending from said first and second legs;
   a notch in each of said arms;
   a pivot pin extending from opposed sides of said cradle and supported in said notches, said pivot pins positioned in said notches providing said swingable cradle movement.

3. The holder as claimed in claim 2 further comprising a lug extending from opposed sides of said cradle for receiving an end of each pivot pin therein, each lug presenting a threadable aperture for functionally engaging threads positioned about said pivot pin, said threadable relationship between each lug and pivot pin therein allowing for a functional length of each pivot pin to be variously adjusted.

4. The holder as claimed in claim 2 wherein said second mounting means comprises a longitudinal slot extending along each arm and in communication with said notches, said pivot pins slidable along said slots to provide for said longitudinal movement of said cradle.

5. The holder as claimed in claim 4 wherein said cradle comprises:

a cylinder having an open end for insertion of a gas torch therein, said cylinder adapted to receive the torch in a friction fit rotatable relationship therein.

6. The holder as claimed in claim 5 further comprising a plurality of ribs about an interior surface of said cylinder, said cylinder adapted to engage sides of the propane gas torch to diminish movement of the torch from said cylinder.

7. The holder as claimed in claim 1 further comprising a roughened surface at each free end of said leg, said roughened surfaces adapted to enhance a purchase on an item positioned between said free ends at said first contiguous relationship.

8. The holder as claimed in claim 1 wherein said positioning means comprises an arc connecting said legs opposite said leg free ends for presenting a horseshoe configuration, said arc and legs being of a resilient material whereby said free ends normally bear one against the other to present said first relationship.

9. The holder as claimed in claim 2 wherein said first and second arms comprise:
   a C-shaped portion initially extending from said base and away from said leg free ends and subsequent towards said leg free ends;
   a generally horizontal portion extending from said C-shaped portion and terminating at a free end above said base, said notch and slot positioned in said horizontal portion.

10. A holder for a gas torch, the torch having a discharge head for directing heat therefrom onto an item, the holder comprising:
   a base:
      means on said base for presenting first and second clamping surfaces in a first contiguous relationship and a second spaced-apart relationship;
   a cradle for a gas torch;
   a pivot pin extending from said cradle;
   at least one pivot arm upwardly extending from said base;
   a notch in said at least one pivot arm for receiving a portion of said pivot pin therein, said cradle swingable about said pivot pin;
   a slot in said at least one arm for receiving a portion of said pivot pin therein, a slidable movement of said pin along said slot longitudinally moving said cradle, said cradle swingable and longitudinal movement adapted to cause a like movement of a torch in said cradle, whereby to position a heat discharge head of a torch in said cradle relative to an item positioned between said clamping surfaces.

11. The holder as claimed in claim 10 wherein said base includes first and second legs, each leg having a free end presenting one of said clamping surfaces.

12. The holder as claimed in claim 10 wherein said cradle comprises:
   a cylinder having an open end for insertion of a gas torch therein, said cylinder adapted to receive the torch in a friction fit rotatable relationship therein.

13. The holder as claimed in claim 12 further comprising a plurality of ribs about an interior surface of said cylinder, said cylinder adapted to engage sides of the gas torch to diminish movement of the torch from said cylinder.

14. The holder as claimed in claim 11 further comprising a toughened surface at each free end of said leg, said roughened surfaces adapted to enhance a purchase on an item positioned between said free ends at said first contiguous relationship.

15. A holder for positioning first and second items in a desired relationship, the holder comprising:

a base, said base comprising:
   first and second legs presenting free ends at an end of each leg;
   means for positioning said free ends of said legs in a first normal contiguous relationship and a second spaced-apart relationship;
a cradle for a first item;
   first means on said base for mounting said cradle above said base in a user-operable swingable movement about a horizontal axis above said base;
   second means for mounting said swingable cradle to said base in a user-operable longitudinal movement along said underlying base, said user-operable movements adapted to position the first item in said cradle relative to a second item positioned between said contiguous leg free ends.

16. The holder as claimed in claim 15 wherein said first mounting means comprises:
   first and second arms respectively upwardly extending from said first and second legs;
   a notch in each of said arms;
   a pivot pin extending from opposed sides of said cradle and supported in said notches, said pivot pins positioned in said notches providing said swingable cradle movement.

17. The holder as claimed in claim 16 wherein said second mounting means comprises a longitudinal slot extending along each arm and in communication with said notch, said pivot pins slidable along said slots to provide for said longitudinal movement of said cradle.

18. The holder as claimed in claim 17 wherein said cradle comprises:
   a cylinder having an open end for insertion of a gas torch therein, said cylinder adapted to receive the torch in a friction fit rotatable relationship therein.

19. The holder as claimed in claim 15 further comprising a roughened surface at each free end of said leg, said roughened surfaces adapted to enhance a purchase on an item positioned between said free ends at said first contiguous relationship.

20. The holder as claimed in claim 15 wherein said positioning means comprises an arc connecting said legs opposite said leg free ends for presenting a horseshoe configuration, said arc and legs being of a resilient material whereby said free ends normally bear one against the other to present said first relationship.

* * * * *

UNITED STATES PATENT AND TRADEMARK OFFICE
CERTIFICATE OF CORRECTION

PATENT NO. : 5,720,456
DATED : February 24, 1998
INVENTOR(S) : William S. Szybura It is certified that error appears in the above-identified patent and that said Letters Patent is hereby corrected as shown below:

Column 3, line 41, delete "adapt" and substitute --adapted--.

Column 4, line 6, delete "propane".

Column 4, line 62, delete "toughened" and substitute --roughened--.

Signed and Sealed this

Ninth Day of June, 1998

Attest:

BRUCE LEHMAN

Attesting Officer

Commissioner of Patents and Trademarks